US006945063B2

(12) United States Patent
Max

(10) Patent No.: US 6,945,063 B2
(45) Date of Patent: *Sep. 20, 2005

(54) APPARATUS AND METHOD FOR HARVESTING ATMOSPHERIC MOISTURE

(75) Inventor: Michael D. Max, Washington, DC (US)

(73) Assignee: Marine Desalination Systems, L.L.C., Washington, DC (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/603,600

(22) Filed: Jun. 26, 2003

(65) Prior Publication Data

US 2004/0000165 A1 Jan. 1, 2004

Related U.S. Application Data

(60) Provisional application No. 60/391,923, filed on Jun. 28, 2002.

(51) Int. Cl.[7] .......................... F25B 27/00; H01L 25/00; H02N 6/00
(52) U.S. Cl. ...................................... 62/235.1; 136/246
(58) Field of Search .......................... 62/235.1; 136/246

(56) References Cited

U.S. PATENT DOCUMENTS

| 4,429,545 | A | * | 2/1984 | Steinberg | ................... 62/235.1 |
| 5,275,643 | A | | 1/1994 | Usui | |
| 5,846,296 | A | * | 12/1998 | Krumsvik | ..................... 95/115 |
| 5,857,344 | A | * | 1/1999 | Rosenthal | ...................... 62/93 |
| 6,182,453 | B1 | | 2/2001 | Forsberg | |
| 6,289,689 | B1 | | 9/2001 | Zakryk | |
| 6,349,563 | B1 | * | 2/2002 | Kinoshita | .................... 62/476 |
| 6,581,849 | B2 | * | 6/2003 | Zhang | ......................... 239/63 |

FOREIGN PATENT DOCUMENTS

| CN | 1223325 A | 7/1999 |
| DE | 3313711 A | 10/1984 |
| DE | 3541645 A1 | 6/1987 |
| DE | 003936977 A1 | 5/1991 |
| DE | 19632272 A1 | 2/1998 |
| DE | 10154351 A1 | 5/2003 |
| ES | 2156707 A1 | 7/2001 |
| FR | 2509023 A | 1/1983 |
| GB | 2 376 401 A | 12/2002 |
| JP | 09099201 A | 4/1997 |

OTHER PUBLICATIONS

Zweibel, Kenneth and Paul Hersch, "Basic Photovoltaic Principles and Methods," PV Support Equipment, Van Nostrand Reinhold Company Inc. (New York), (1984), pp. 171–173.

* cited by examiner

Primary Examiner—Cheryl J. Tyler
Assistant Examiner—Filip Zec
(74) Attorney, Agent, or Firm—Kenneth M. Fagin, Esq.

(57) ABSTRACT

An atmospheric water harvester extracts water from high relative humidity air. The temperature of the surface of a condensation member is lowered in the presence of moist air to promote condensation of water vapor on its surface, and the water so obtained by condensation is collected. The atmospheric water harvester includes a photovoltaic member that generates electricity to power the refrigeration of the condensation member. At least as much electrical power is produced as is used to condense the water vapor so that no additional sources of electrical power are required. Each atmospheric water harvester (or array of harvesters) is rapidly installed and then operated in an unattended state for considerable periods of time. Arrays of autonomous atmospheric water harvesters can be installed as free-standing units or as roofs on either new or existing buildings.

49 Claims, 9 Drawing Sheets

APPARATUS AND METHOD FOR HARVESTING ATMOSPHERIC MOISTURE

PRIOR PROVISIONAL APPLICATION INFORMATION

This Application is based on Provisional Application No. 60/391,903 filed Jun. 28, 2002, the entire contents of which is hereby incorporated by reference.

FIELD OF THE INVENTION

In general, the invention relates to "harvesting" water from the atmosphere.

BACKGROUND OF THE INVENTION

Provision of water is a problem where rainfall is scarce, strongly seasonal, or where there are relatively small catchment areas and little natural local water storage. This is particularly true for remote locations such as oceanic islands and for coastal areas where the fresh water table is relatively shallow or not well developed because of subsurface geological conditions.

On oceanic islands, for example on Bermuda in the central Atlantic Ocean, water is provided mainly by rain catchment on most buildings, including virtually all private homes. Water is stored locally in cisterns into which the run-off flows directly. Because the water is derived from rainwater run-off from roofs, there is often both biological and sediment contamination. When rainfall is sparse, the collection of water is insufficient for demands and where populations are high, water rationing is common. Low rainfall also increases the level of pollution. In addition, where roofs are of such a size that not enough water can be captured directly from run-off for local use, for instance from roofs of factories on Saipan in the western Pacific, water must be provided from another source.

Similarly, the capture of rainwater and pumping of shallow wells for human use, including industrial purposes, in localities where there is a very thin fresh water groundwater layer on top of a saline-saturated substrate substantially degrades the environment on many of these islands and related localities. Capture of rainwater prevents it from recharging fragile groundwater systems.

Water companies in most of the United States plan water requirements based on an average water use for an individual in an urban environment of about 100 gallons per day. Where water supplies are restricted, such as in most of the Caribbean Islands for instance, 50 gallons per day represents average per capita total water use. In arid areas or where water infrastructure is poor, average per capita consumption (for all purposes) is commonly below 10 gallons per day, even when water supplies are normal. Natural water resources often do not meet local demands now, and population growth is increasing. Thus, new sources of fresh water for human consumption are required now.

In addition, relatively smaller amounts of high quality potable water are required from time to time where natural or man-made disasters render water and electrical infrastructure unusable, or in remote locations where distributed water supplies are required and no water infrastructure exists.

SUMMARY OF THE INVENTION

One source of fresh water that has not previously been drawn upon in any known significant manner is the atmosphere, especially in those areas near warm seawater where the atmosphere contains significant volumes of water vapor. In these areas, the amounts of water in the atmosphere that can be recovered is related to both the initial relative humidity and the temperature to which this warm, moisture-laden air can be cooled so that water condenses. Where relative humidity is high, considerable amounts of water are held in the air.

Table 1 shows two examples of the amount of water contained in warm air at about sea level, which examples are typical of most tropical and sub-tropical regions near large bodies of water. Where the temperature of the fully saturated air is higher, more water is present as vapor, and where colder temperatures can be reached during the condensation phase, more water may be recovered.

TABLE 1

| 1 Air Temperature, °F. | 2 Relative Humidity, % | 3 Water Content/ 100 m$^3$ air, g | 4 Water Content/ 100 m$^3$ air, liters | Cooled To: | Relative Humidity, % | Water Condensed | Water Condensed |
|---|---|---|---|---|---|---|---|
| 80 | 100 | 2531 | 2.54 | 70 | 100 | 686 | 0.69 |
|  |  |  |  | 60 | 100 | 1204 | 1.21 |
|  |  |  |  | 50 | 100 | 1591 | 1.59 |
|  |  |  |  | 40 | 100 | 1876 | 1.88 |
| 80 | 80 | 2027 | 2.04 | 70 | 100 | 182 | 0.18 |
|  |  |  |  | 60 | 100 | 700 | 0.70 |
|  |  |  |  | 50 | 100 | 1087 | 1.09 |
|  |  |  |  | 40 | 100 | 1372 | 1.37 |

Table 1. Water content and production potential for 80% and 100% relative humidity. More cooling is required to produce water from air in which the relative humidity is less than 100%. The amount of water condensed listed in columns 3 and 4 relates only to condensed water vapor removed when the humid air temperature is lowered to the indicated levels. Remaining air is saturated with water vapor at the temperature to which the air has been cooled.

The present invention provides a new method and apparatus for obtaining high quality water, of distilled water character and in which virtually no dissolved solids are present, by using a light-weight, self-contained, passive system for harvesting atmospheric moisture when relative humidity is high. In locations where there is high relative humidity throughout the diurnal cycle, water may be condensed and collected according to the invention both during the day as well as at night, whenever relative humidity is high enough. Even in locations where the air tends to have low relative humidity during the heat of the day, the relative humidity usually rises during the night and will often be at near 100% humidity for long periods of the diurnal cycle. This condition prevails even in most semi-arid and arid regions. At these times of high relative humidity, water may be collected according to the invention using autonomous atmospheric water harvesters.

Apparatus according to the invention, referred to as an "autonomous atmospheric water harvester," includes two main parts, namely 1) one or more water vapor condensation and collection members each having a surface upon which water is condensed and collected, and 2) an energy-gathering member such as a photovoltaic panel that produces electricity to power condensation-driving refrigeration. Additionally, the apparatus includes a frame to secure the photovoltaic member and the one or more condensation members firmly in place. An air passage is formed between the energy-gathering member (photovoltaic member) and the condensation member, and additional air passages are formed between condensation members where there are more than one condensation member.

High relative humidity air passes through the air passage or passages, where it is cooled. Water vapor from the chilled air, which becomes supersaturated with moisture, thus condenses onto the condensation member. The condensed water flows under the force of gravity off the condensation member and is collected in a separate container.

Electricity used to power the cooling (i.e., refrigeration) necessary to condense the water vapor is produced by the apparatus itself, which can operate in a stand-alone, essentially unattended mode for long periods of time. Where it is needed or desired to store electrical energy, batteries or fuel cells are used for each autonomous atmospheric water harvester or group of harvesters. Moreover, surplus electrical energy produced during sunlight hours (i.e., electrical energy in excess of that required for cooling and condensation) may be added into an existing electrical grid, from which grid electricity later may be drawn when no electricity is being produced by the water harvesters. Where no electrical grid exists to absorb large quantities of electrical energy, local energy storage systems or methods for storing the excess electricity in the form of potential energy, e.g., pumping water into towers or up-hill reservoirs (hydroelectric pump storage), may be employed.

The purpose of the water harvester is not to dramatically reduce the temperature of the air passing through the apparatus (as in an air conditioning unit) or to primarily dry the air (as in an air dehumidifier), but to only chill the air sufficiently to condense the required amounts of water from relatively humid air. The air exiting the water harvester may be only slightly chilled and may still contain considerable moisture. Thus, the water harvester constitutes a third, and new type of apparatus for the treatment of air, which is designed to achieve the objective of condensing water from air.

BRIEF DESCRIPTION OF THE DRAWINGS

The invention will now be described in greater detail in connection with the drawings, in which.

DETAILED DESCRIPTION OF A PREFERRED EMBODIMENT OF THE INVENTION

Preferably, an autonomous atmospheric water harvester according to the invention condenses atmospheric water vapor to yield liquid water while producing at least sufficient electrical power for its own operation.

Figure 1:
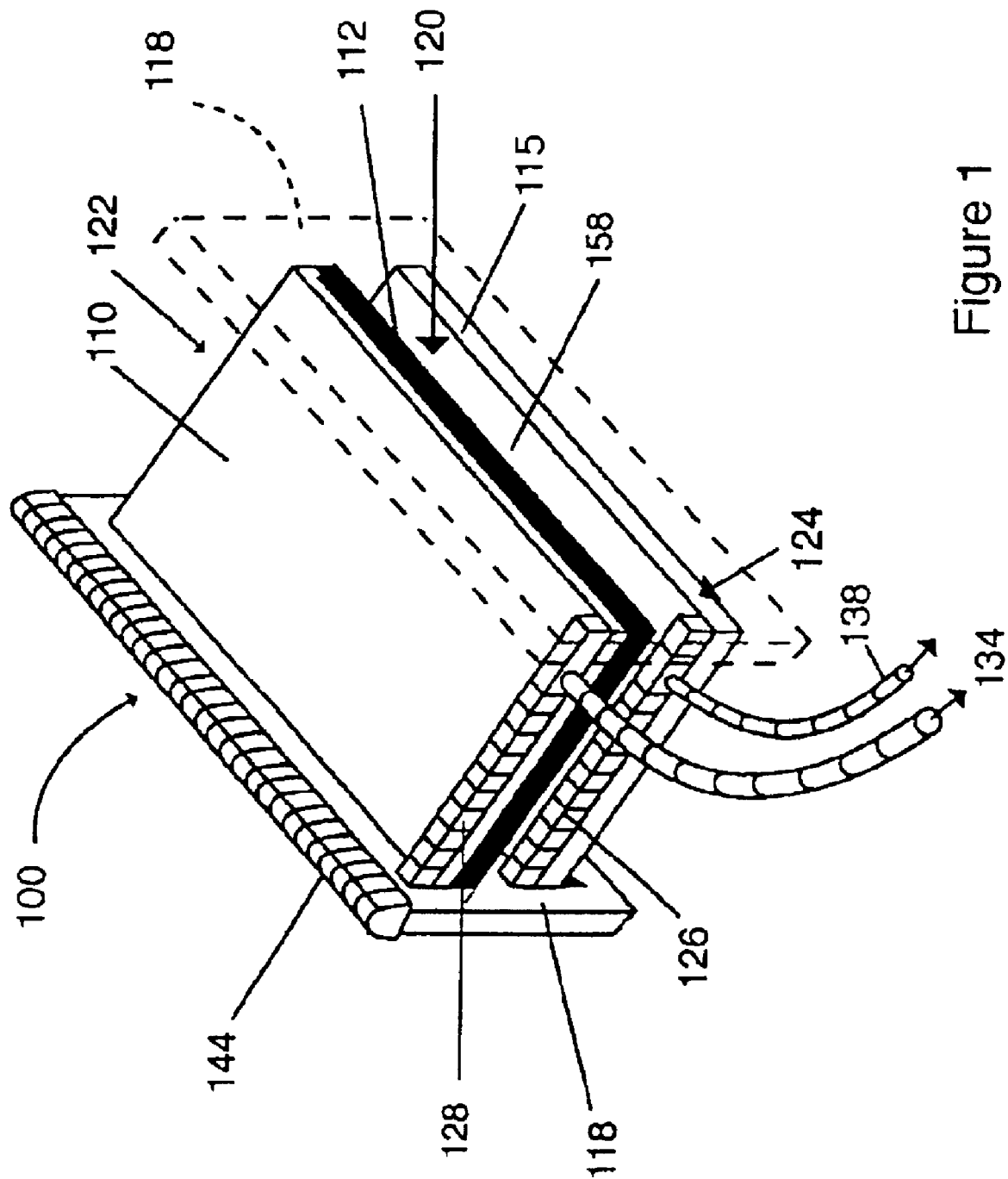
FIG. 1 is a generalized perspective view of an autonomous atmospheric water harvester according to the invention.

In one embodiment, as shown in FIG. 1, an autonomous atmospheric water harvester 100 according to the invention has a rigid, panel-type photovoltaic member 110, a panel-type condensation member 115, and a frame or support member 118 on each side (nearside shown in phantom for clarity) that hold the members securely in place with respect to each other and that give the entire autonomous atmospheric water harvester a box-section configuration having substantial physical strength. The side frame members are also used to affix multiple autonomous atmospheric water harvesters together and/or to supports.

The panel-type members of the harvester are illustrated in FIG. 1 as flat for diagrammatic simplicity. It should be understood, however, that a variety of surface configurations may be used to facilitate the condensation, collection, and removal of the harvested water. The water produced by condensation should be essentially pure and suitable for potable use after relatively little treatment, e.g., light chlorination. Because the product water is essentially distilled water, it will be necessary or desirable to add salts or mix a certain proportion of seawater with it so that the water is suitable for continuous human or animal consumption.

Where a water- and weather-proof abutting connection is required between two or more water harvesters, a cap-type sealer strip 144, which has inert and long-lived properties similar to silicone rubber, may be fitted over the edges of the frame member 118 which extend above the photovoltaic member 110 so that adjacent harvesters may be joined together in side-to-side fashion. The sealer strip may be held in place by friction, with glue, or some other means such as bolts or snap-clips. Other means of sealing adjoining panels, such as adhesive or O-ring sealing, may also be used.

The ends 122, 124 of each autonomous atmospheric water harvester 100 are open so that an air passage 120 is formed through the harvester assembly. Moist air from the ambient air mass surrounding the autonomous atmospheric water harvester flows or is caused to flow across exposed, refrigerated apparatus or the refrigerated face of the condensation member 115. As the moist air flows through the harvester, i.e., across the condensation member 115, water vapor condenses out of it and accumulates on the surface of the condensation member 115. Therefore, materials such as metals that maintain electric charge are used within the air passage to retard the establishment and growth of microorganisms, so long as no hazardous material residue is added to the product condensed water.

The ends of the air passage 120 are preferably screened to keep larger animals, e.g., birds and bats which could roost in the air passage, out of the air passage 120. The screens are removable so that they can be removed for periodic cleaning of the air passage.

Water harvesters are arranged in a tilted position so that water that condenses or gathers on the condensing surface flows, under the influence of gravity, to the lower end 124 of the harvester. At the lower end 124, water is collected by a catch trough or physical barrier 126 that causes the water to flow laterally along the panel such that it can be transported away from the condensation member by a pipe 138.

Electrical energy to power the requisite cooling is generated by the photovoltaic member 110, which is the uppermost part of the autonomous atmospheric water harvester 100. In addition to water obtained via condensation and collection of atmospheric moisture, water is also obtained from rainwater run-off. A catch-trough 128 is located at the lower end of the photovoltaic member 110 to catch rainwater as it flows down along the surface of the photovoltaic member 110, and rainwater caught by the barrier 128 is removed to storage through piping 134.

The amount of rainwater run-off obtained or captured using the atmospheric water harvester 110 will be at least as large as that obtained from any roof of the same size as the harvester, and this water, which is likely to be polluted with material washed from the roof, can be used for all non-potable purposes or treated to potable quality water standards. This run-off water is kept separate from the water collected by the condensation member 115 because the rainwater may be polluted with matter such as dust, pollen, and bird excreta that falls onto the surface of the member 110. The photovoltaic member 110 shelters the condensation member 115 from matter falling from or generally settling out of the air, thereby helping to preserve the quality of the water produced by condensation of water vapor.

Insulation 112 is affixed to the back of the photovoltaic member 110 so that as the photovoltaic member 110 warms due to its direct exposure to sunlight, it is substantially prevented from warming air in the airway 120, which would otherwise make the condensation member 115 less efficient when water is being produced by condensation during the day. In the embodiment shown in FIG. 1, there is only a single condensation member 115. In this embodiment, the condensation member 115 may also have a layer of insulation on its exterior (i.e., lower) surface to help isolate the cooling region from unwanted heat that would decrease overall efficiency.

Figure 2:
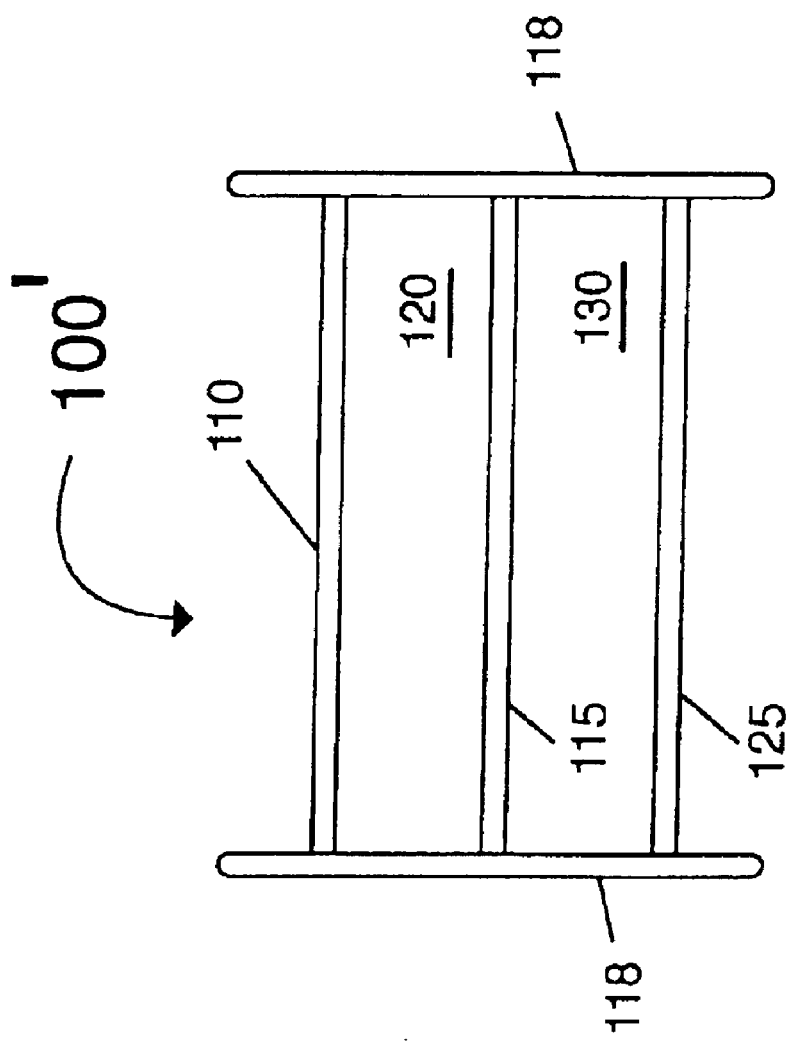
FIG. 2 is a generalized end view of an autonomous water harvester having two condensation members.

Although only one condensation member 115 and one air passage 120 are shown in FIG. 1, more than one condensation member may be provided, which would form more than one air passage. Thus, in another embodiment 100' as shown, for example FIG. 2, the addition of a second condensation member 125 that forms a second airway 130 increases the water production capability of the harvester 100'. In addition, where a condensation member (e.g., condensation member 115 in FIG. 2) has air passages on both sides, both sides of the condensation member may have cooling surfaces or coils (illustrated in more detail below) on which water is condensed. Water condensing on coils located along the lower surface of the condensation member 115 will drip onto the condensation member below it, from which it is collected. Thus, the more air passages and condensation members an autonomous atmospheric water harvester has, the greater the potential for water production. Thus, assuming electric power, the ambient humidity of the moist air, and the structure carrying the harvester or group of harvesters is adequate, increased water production can be achieved by producing water from more than one condensation and water collection surface.

The number of cooling members and air passages—for instance, the number of harvesters to be joined along a common air passage axis, thereby forming a longer, compound airway, or the number of harvesters to be joined side-by-side—and the required airflow that will yield optimal water harvesting for particular installations is a function of the area to be covered and the local atmospheric conditions. In circumstances where a maximum amount of water condensation is required, as many condensation members and air passages as is desirable and practical may be employed.

A presently preferred system for cooling the condensation member 115 is conventional refrigeration. Conventional refrigeration devices operate using a vapor- or a vapor-liquid cycle to absorb heat from one region and disperse it in another region. In such systems, a refrigerant is compressed, thereby generating heat that is dispersed in air remote from the area in which refrigeration is required. The compressed refrigerant is then circulated through pipes or other conduits to the area where cooling is required, where pressure within the refrigeration system conduits is reduced. The refrigerant expands and vaporizes, cooling as it does so. The cooled refrigerant is then circulated through the region in which cooling is desired. This cooled refrigerant is warmed via heat exchange with the region, and the region is cooled.

Figure 3:
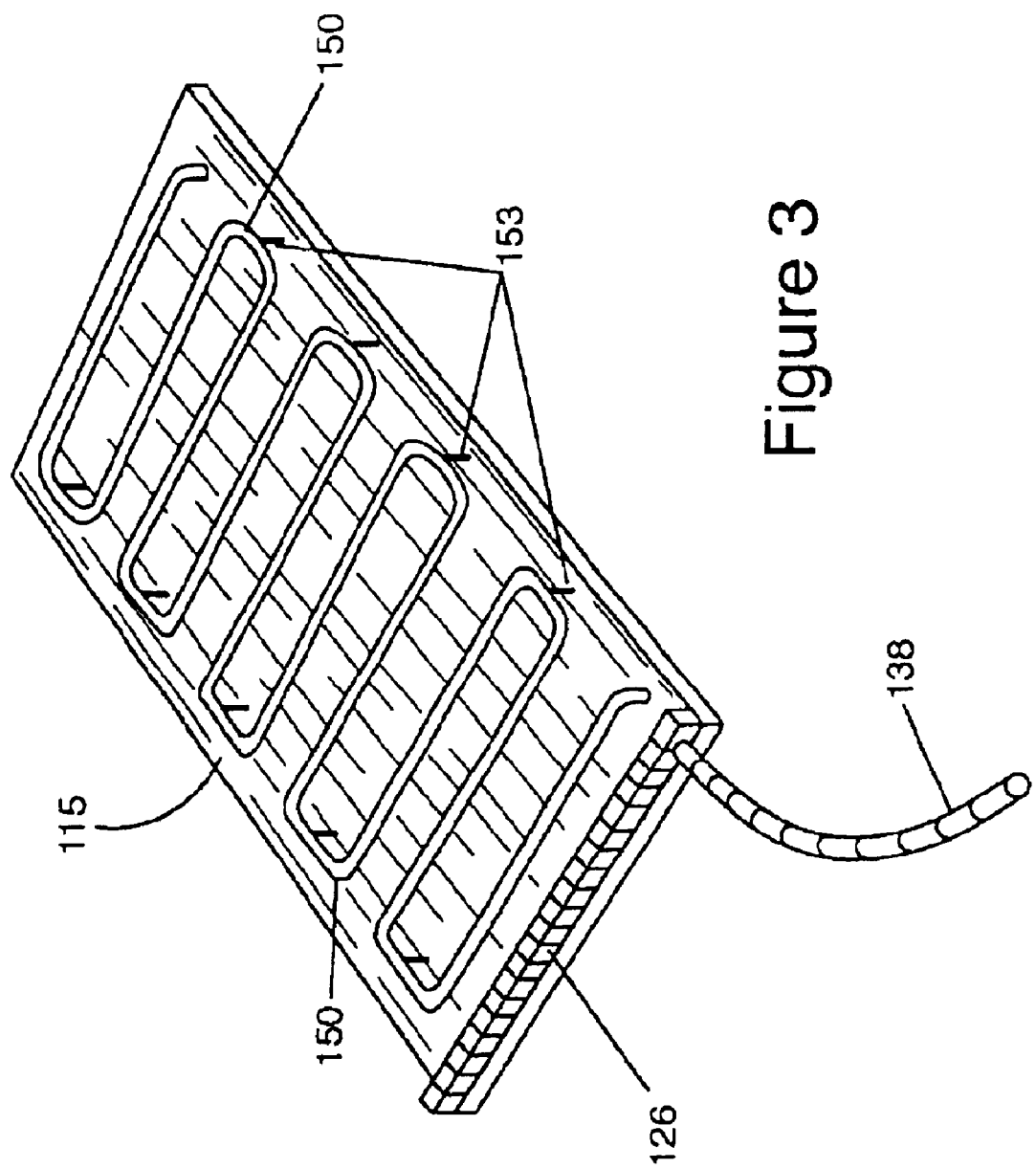
FIG. 3 is a diagrammatic view of a planar disposition of cooling coils above the condensation member, which is also cooled by its proximity to the coils.

In an autonomous atmospheric water harvester, the area in which chilling is required is the area within the air passage or air passages 120, 130, at the surface of each condensation member or immediately adjacent to it, so that the water vapor in the moist air passing through a given air passage condenses and can be collected for use as fresh water. In one cooling system configuration, as illustrated in FIG. 3, exposed cooling coils 150 are arranged in a plane above the condensation member 115 but near enough to it so that the surface of the condensation member may also be somewhat chilled. The cooling coils 150 are held in place by supports 153. The refrigerant course leading to the cooling coils 150 is embedded in the condensation member 115, and connections with other harvesters are made between fixed connector points within the condensation members.

In this configuration, water condenses on the cooling coils and drips onto the upper surface of the condensation member 115, where the water gathers through coalescing of drops of water and flow of the collected water to the lower end of the member. The gathering water is diverted by the collector trough or barrier 126 into a removal pipe 138, through which it is removed for storage.

Alternatively, cooling coils may be disposed in more than one plane or in a more complex fashion, e.g., within multiple air passages 120, 130 of a multiple air passage assembly. In such a configuration (not illustrated), the coils are sized and located to create optimum conditions of air flow and heat exchange. Water is collected in the same manner described above.

In another configuration of the cooling system for a water harvester, the entire cooled fluid circulation system is miniaturized and embedded in a material having a high degree of thermal conductivity, which are known in the art. This is done in a fashion similar to some refrigeration systems designed for aircraft and spacecraft, where weight and size are important considerations and where physical protection of the refrigeration pipe system is important. Refrigeration apparatus such as these are also very durable and capable of long-term operation in unmaintained situations.

Figure 4:
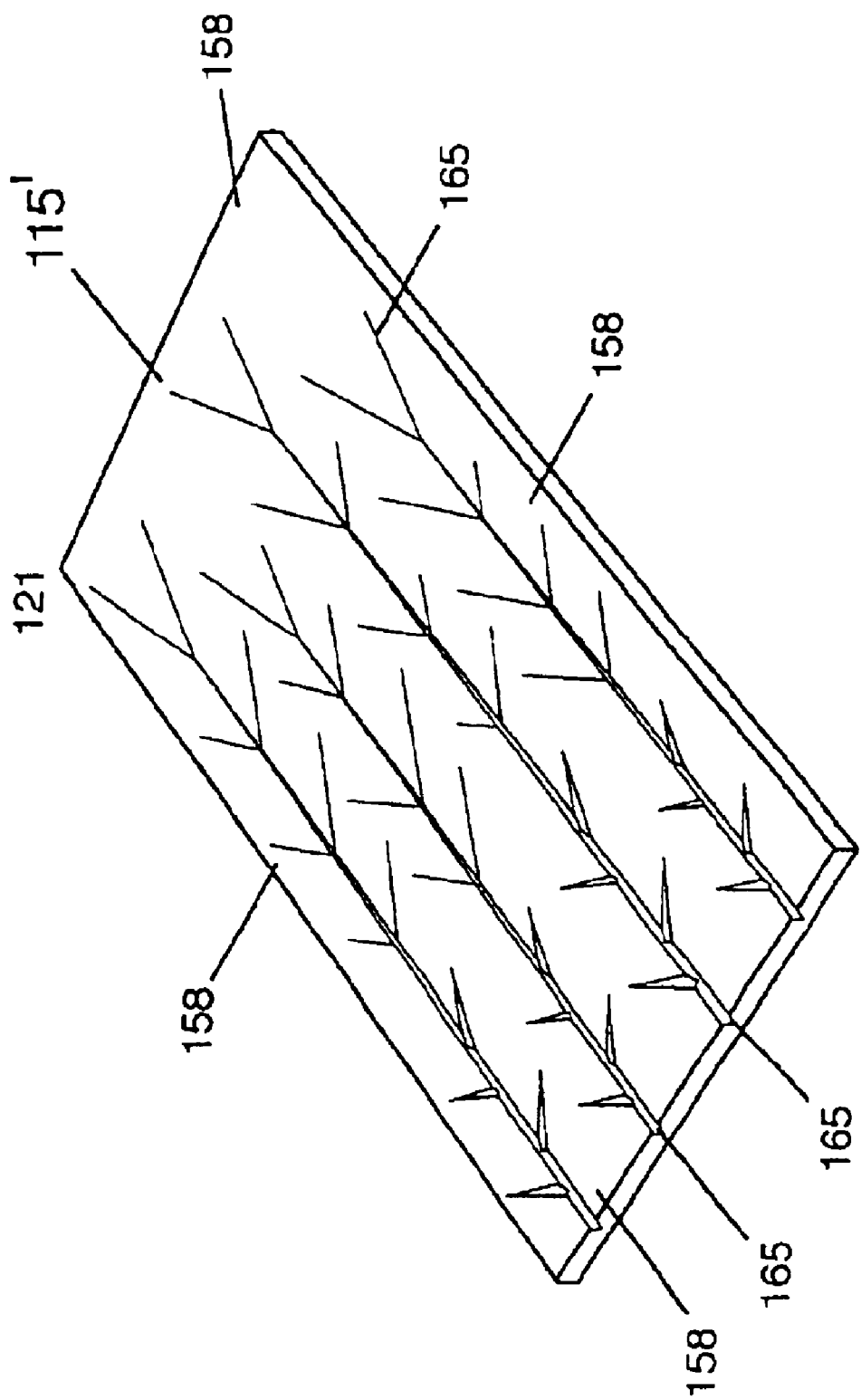
FIG. 4 is a generalized perspective view of a dendritic drainage system incised in the surface of a condensation member upon which condensation takes place directly.

In such a cooling system configuration, illustrated in FIG. 4, a cooled flat panel 115' has small diameter pipes on the order of a centimeter or less in diameter carrying the refrigerant that are embedded beneath the surface of the condensation member to provide a refrigerated surface 158 on which condensation can take place. Embedding the refrigerant pipes provides a number of benefits. For example, the temperature of the chilled surface 158 of the refrigerated member 115' as a whole can be controlled by redirecting fluid using constrictor control valves to meet heat local sink demands. In addition, physical protection is provided by the material into which the refrigerant conduits are embedded.

Other means of refrigeration may also be employed. Thermoelectric coolers (TECs), for instance, are solid state heat pumps that utilize the Peltier effect, which is a solid-state method of heat transfer through dissimilar semiconductor materials. TECs may have particular application where light weight is a primary requirement. These would also be used where flat or complex surfaces were desired to be cooled, as circulated refrigerant is more difficult to use in those applications. Magnetocaloric effect (MCE) refrigeration exploits the magnetic properties of certain materials that warm when they are magnetized and cool when they naturally demagnetize. That method may also be used when cooling a surface is required because, like TECs, no circulating refrigerant is used or needed. However, because the surface alternately warms and cools as it is magnetized and demagnetized, condensation would be intermittent or cyclical rather than continuous. Thermoacoustic coolers (TACs) or pulse tube coolers can also be employed. They are gas-filled variable diameter tubes in which acoustic energy (instead of mechanical compression) is used to drive the compression and expansion of the circulated refrigerant.

Hydrophilic materials such as special polymers that attract water molecules (e.g., nylon or rayon) may be used on the surface 158 of the member 115' where condensation takes place. When droplets form directly on the surface, they increase in size and mass by coalescing with other water droplets and by direct condensation of water vapor onto their surfaces. Thus, the droplets gain mass and merge into streams that flow under the influence of gravity.

To assist this movement of water, a dendritic system of micro-channels 165 that increase in cross-sectional area down the slope of the condensation member 115' is engraved into the surface 158 of the condensation and water gathering member 115'. Ideally, hydrophobic materials that repel water molecules (e.g., Teflon) are used to line the surfaces of the micro-channels to promote rapid water flow from the upper end to the lower end of the condensation member 115'.

Figures 5A, 5B:
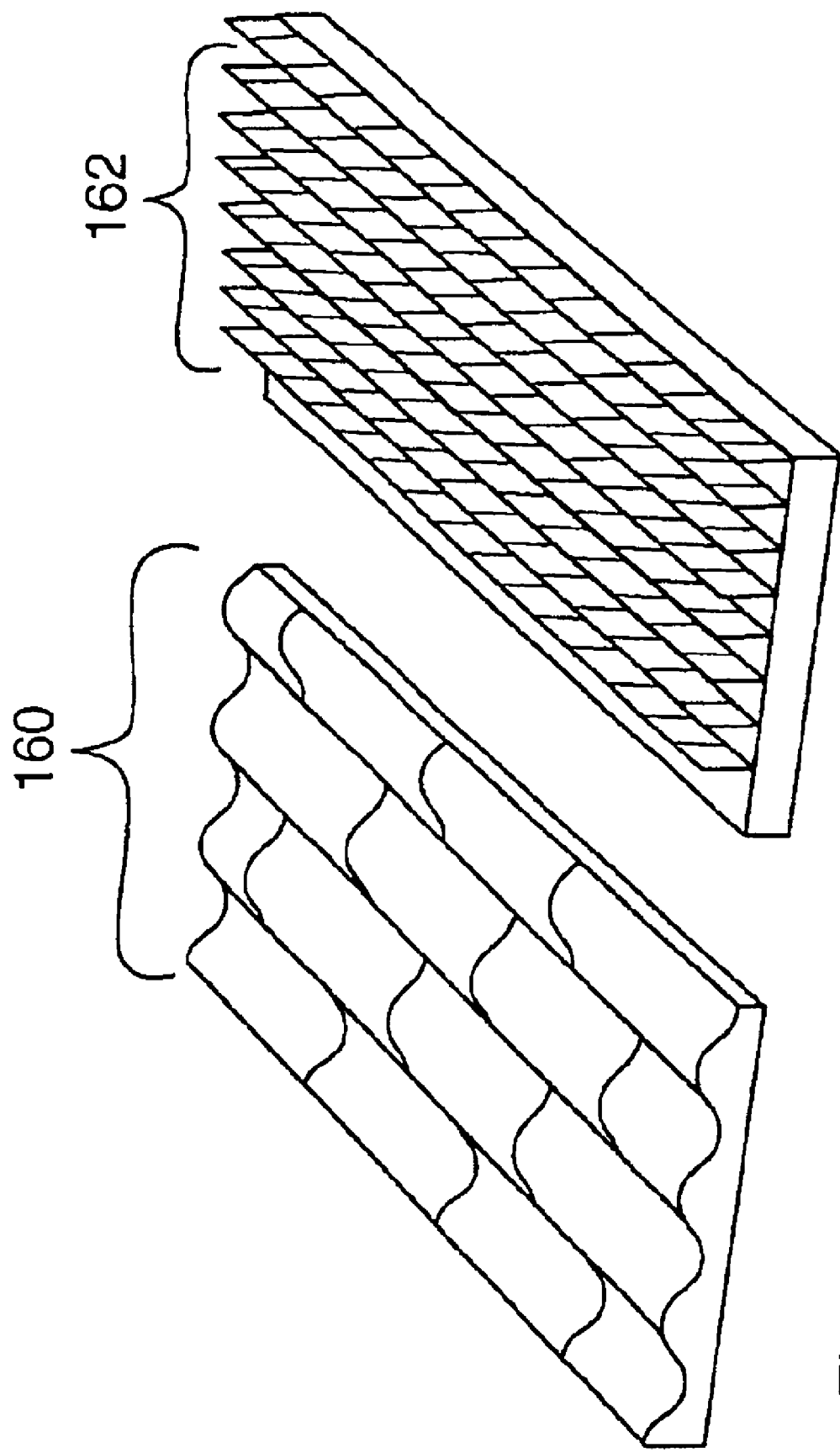
FIG. 5 is a generalized perspective view of corrugations and fins on the refrigerated surface of a condensation members.

Furthermore, as illustrated in FIG. 5A, cooling member surfaces are preferably either corrugated, e.g., as at 160 or, as illustrated in FIG. 5B, finned, e.g., as at 162. This increases the surface or heat transfer area and thus increases the rate of condensation and accumulation of water.

In another cooling system configuration (not illustrated), one or more planar or more complexly arranged exposed refrigeration coils and a refrigerated surface of the condensation and water gathering member are combined. This maximizes refrigeration within the air passages.

Because the air cools and water condenses from it as the air moves through the air passage, the temperature of the cooling coils and/or the condenser member surfaces may be controlled to form local cooling zones, where different temperatures are maintained. This helps distribute the cooling load more equally and of improves the efficiency of water production by not overcooling some of the air and by facilitating condensation occurring generally equally along the length of the air passage for best water production. Additionally, optimizing temperatures, distribution of water production, and air flow will lead to the lowest energy costs per volume of water produced.

Figure 6:
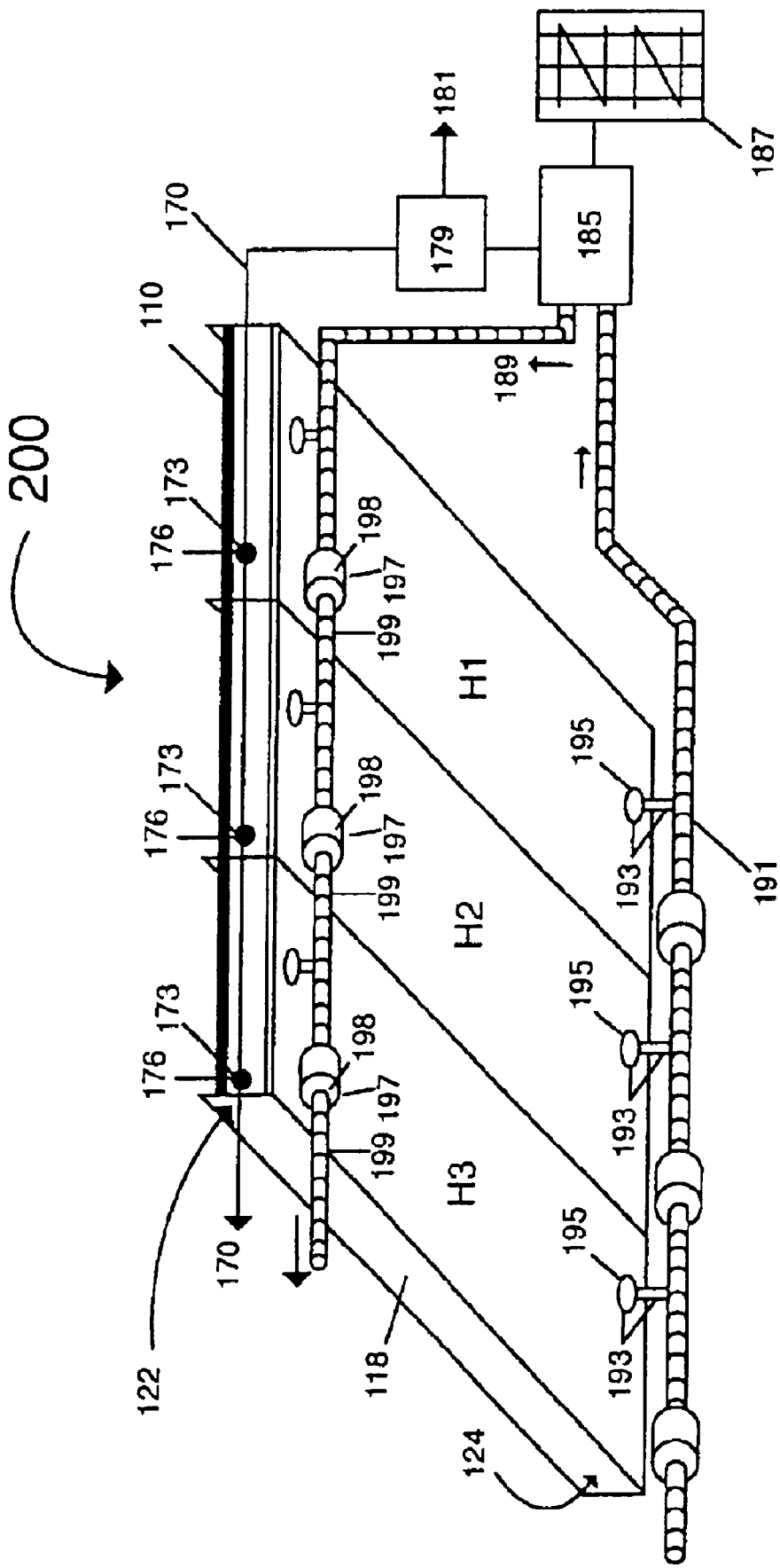
FIG. 6 is a generalized view of the underside of three water harvesters joined in an array, with provision for grouping refrigerant circulation and electrical-energy gathering into a single system.

As illustrated in FIG. 6, groups of autonomous atmospheric water harvesters, termed "arrays," can be joined together to form a single structural entity. For example, three water harvesters H1, H2, H3 share a single refrigeration system that circulates refrigerant through the array 200 of water harvesters as a whole. Harvesters are designed so that connections between them can be established quickly and securely with prefabricated connecting sections for both conventional gas/fluid refrigerant distribution line 199 and return 191 (where these are used).

The underside of each condensation member of an individual water harvester H1, H2, or H3 that is part of the array 200 has built-in "female" receptors (similar to small fueling points on aircraft and racing cars) that contain their own self-sealing mechanisms for secure, quick-fit connections between the condensation members and the distribution system. These receptors are small depressions into which the "male" connectors of prefabricated electrical and refrigeration connections are inserted. In the refrigerant distribution system, butt-end connectors 197 having a male fitting on one end 198 and a female fitting on the other end 199 allow an essentially continuous pipe configuration to be established rapidly at any array installation, where any number of individual water harvesters are assembled into an array. For refrigerant return, the return line 191 mates with female socket connectors 195 on the underside of the condensation members by a male fitting 193. Unused connectors are self-sealing so that the absence of a connector does not impede operation where a water harvester is to operate independently (i.e., by itself) or at the periphery of an array of harvesters. Different lengths of prefabricated refrigeration system piping are made so that in large arrays, the fewest butt-end connectors are used, as leaks are most likely to occur at mechanical joints.

In addition, a prefabricated electrical energy wiring system includes control cable harnesses 170 that plug into electrical and control sockets 176 in the underside of each photovoltaic member. The prefabricated electrical harnesses 170 have plugs 173 in the connector cable system that fit into the female sockets 176 in each photovoltaic member in the array. Alternatively, each photovoltaic member may have a short, permanent fitted electric cable extending from about the same position as the female socket 176 shown on FIG. 6, which cable plugs into an electric cable with waterproof sockets (not shown). Electricity produced by the photovoltaic members is conditioned in an industry standard regulator and control device 179 used for controlling the output of photovoltaic panels. These regulators can also be linked with an electrical grid 181. Electricity is provided for operation of control and other equipment (not shown). The control system 179 operates and powers the condenser pumps 185 and heat exchanger 187 of the refrigeration system.

It may be required to store electricity to operate the control systems of the panels when the photovoltaic members are not generating electrical power. Electricity produced in excess of that required to recharge the control batteries or capacitor assembly may be stored. Where there is need for excess electricity to be stored locally (e.g., where electrical energy is required at night when the photovoltaics do not produce electricity), larger or higher energy density batteries may be located in the immediate vicinity of an array or group of arrays of autonomous atmospheric water harvesters. The excess electrical energy may be stored at a location remote or removed from the locations of the condensation water harvesters.

A water harvester can be pre-set to operate at particular temperatures on a time-of-day basis. For instance, where local environmental conditions such as the diurnal cycle of relative humidity and ambient temperature can be predicted, operation of the refrigeration system can be pre-set on a calendar basis, much like most heating and air conditioning systems in homes and buildings. However, in order to optimize chilling of the condensation member, a suite of sensors to measure parameters such as temperature, relative humidity, wind, water flow, and water levels can be linked to a computer or manual control (not shown) to provide for precise control over the refrigeration process. This will allow the temperature of the condensation member to be changed in response to changing conditions to optimize condensation and conserve energy.

It is not necessary (or practical) to remove all moisture from a given volume of treated air, i.e., by reducing the temperature to the point where virtually no moisture remains. Also, because of the relatively short time that the moist air will be in the air passage where it can be cooled, it is more practical to reduce air temperature by no more than a few tens of degrees. For instance, Table 1 above shows the significant amounts of water that may be condensed from water vapor while still leaving substantial amounts of water vapor in the moist air. Thus, the temperature of the condensation panel should not be kept too cold, as this will waste energy due to diminishing returns.

Moisture-laden air may be moved through the airway 120 either by gravity or by propulsion, for instance by fans. In particular, depending on the amount of moisture removed from the air and the temperature of the air in the airway following removal of that moisture, the air may be either more or less dense than the surrounding, ambient moist air. As a result, the treated air may move automatically either up or down in the inclined air passage due to such density differences. Such natural airflow is not, however, as dependable as forced airflow where a constant airflow is desired. Thus, small air-thrusters may be used to propel the air regardless of the density contrast with ambient moist air.

An ideal application for an array of panels is for use as a roof. Using arrays of panels on roofs of buildings provides a number of benefits over a conventional roof and conventional water and electricity provision. A roof comprised largely of an array of autonomous water harvesting panels will be strong and provide shelter, electricity, and water all at the same time and as part of the same investment.

Figure 7:
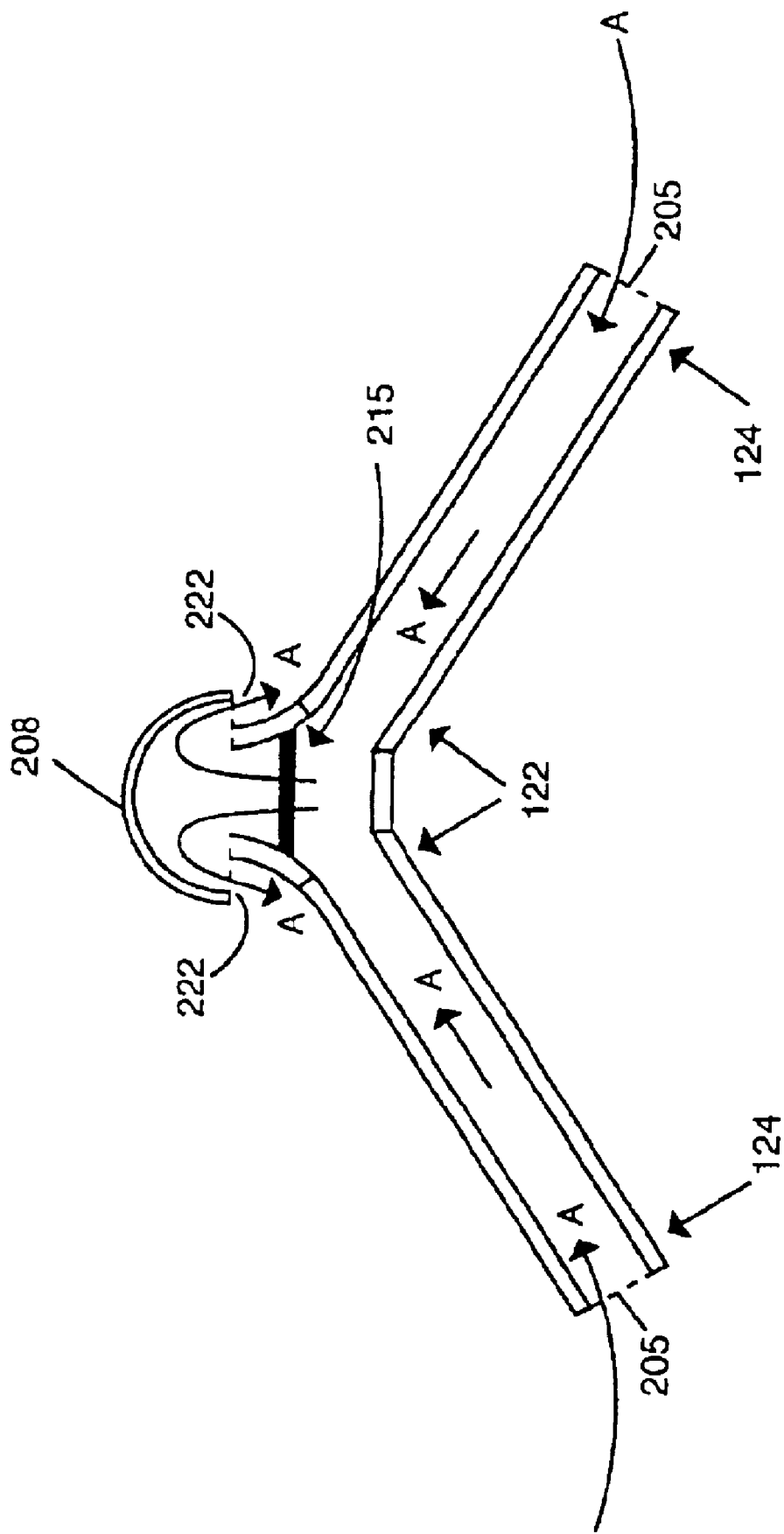
FIG. 7 is a generalized perspective view of an array of water harvesters with screened air passages with a fan assembly in the joined apex.

An example of a thruster assembly for use where water harvesters are part of a peaked roof is shown in FIG. 7. An upper shroud assembly 208 with screened outlets is located above the apex of two harvesters such as would be found in a peaked roof. The thruster assembly consists of a metal or plastic shroud assembly that covers the top of the harvesters. Air A drawn into the lower end 124 of a water harvester passes through the air passages and out the top end 122 of the air passage and then upward through fan assembly 215.

Figure 8:
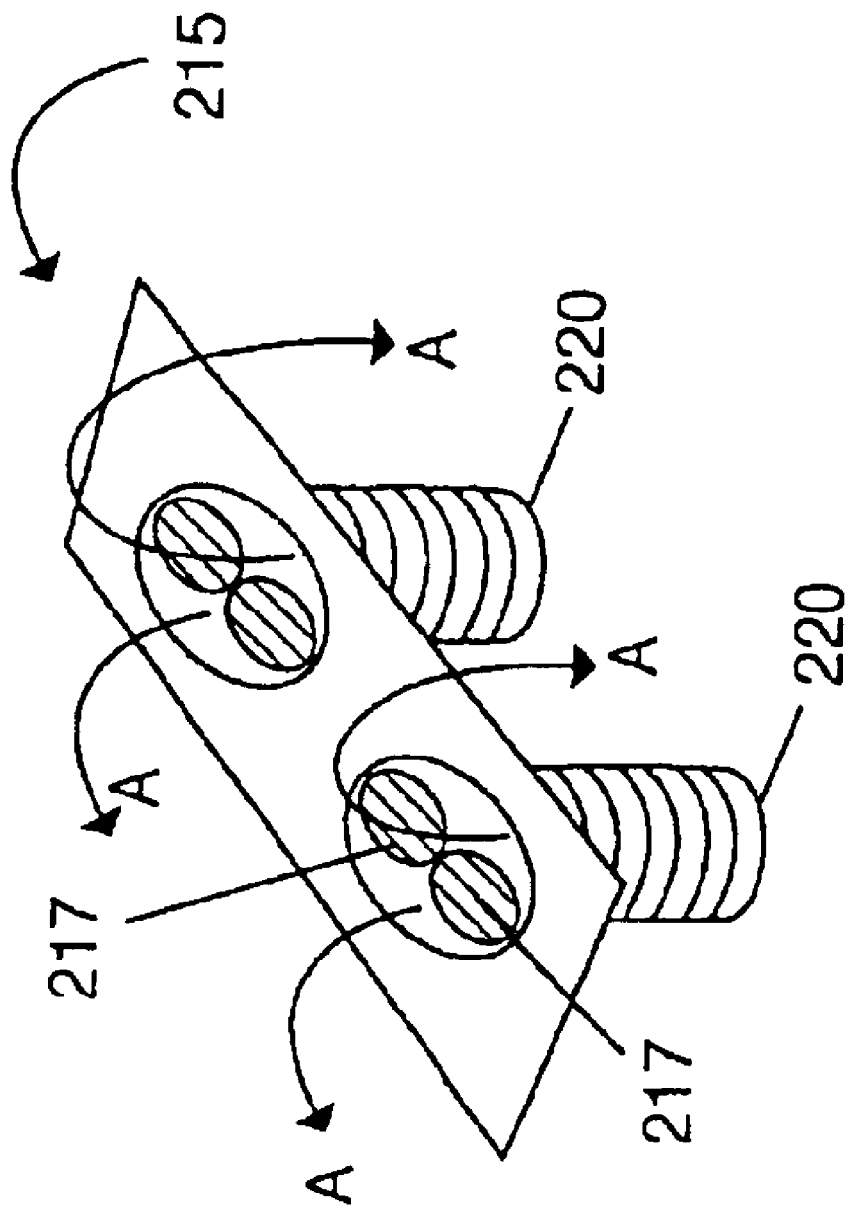
FIG. 8 is a diagrammatic perspective view of a fan assembly employed in the array illustrated in FIG. 7.

The shroud 208 keeps rainwater and other material from falling into the interior spaces and air passages. In addition, the shroud supports the fan assembly 215. Although the fans are illustrated in FIG. 8 as being held in a vertical orientation in the fan assembly 215, with fan motors 220 mounted on the lower side of the fan assembly 215, a number of different orientations for the fans are possible. Fan blades 217 propel the air A while operating, and when the fans are not operating, the air passages ventilate naturally. A downward-facing air exit gap 222 (FIG. 7) is screened, similarly to the screening at the lower entry to the air passage 205 and for the same reasons.

In another configuration (not shown), instead of exhausting the cooled air directly into the surrounding air mass from the shrouded hood at the apex as shown in FIG. 7, the air may be ducted through an insulated air pipe that carries the chilled air away from the air gathering assembly. This chilled air may be used, for instance, as input into an air conditioning system. Although the air within an air conditioning system tends to be mainly recirculated within the air conditioned space, it is good practice for health reasons and to keep the oxygen levels normal to introduce outside air during air conditioning.

Water harvesting apparatus according to the invention is designed for strength, reliability, and durability as well as for optimum photovoltaic and water condensation. Individual autonomous atmospheric water harvesters may be free-standing, but they are more likely to be deployed as groups or arrays of water harvesters. Harvesters and arrays of harvesters operate in a passive mode in that they can be deployed for continued use without excessive maintenance or control. Each array may be autonomous with respect to its operation in that it produces at least the electrical energy that it requires to produce condensed water. Where the electricity that is generated by the photovoltaic members exceeds that required to operate the harvesters, the energy may be put into an existing electrical grid for use elsewhere or from which the harvesters can be powered later, when they are not producing electricity.

An example of the relationship between electricity that can be generated photovoltaically and the relative amount of water that may be condensed can be derived for any location. Two examples of the electricity and water production at typical high solar insolation locations at which atmospheric water harvesting is practical have been calculated (taking into account the efficiencies of the photovoltaic members, the heat energy of condensation, and well known efficiency and energy consumption of conventional refrigeration) and are shown in Table 2.

| Month | Days/Month | Guam | | | Hawaii | | |
|---|---|---|---|---|---|---|---|
| | | Elec. Prod'n[2] (kWh/Mo) | Elec. Prod'n[2] (kWh/Day) | Water Prod'n[3] (Gal/Day) | Elec. Prod'n[2] (kWh/Mo) | Elec. Prod'n[2] (kWh/Day) | Water Prod'n[3] (Gal/Day) |
| Jan. | 31 | 142 | 4.6 | 1.9 | 120 | 3.9 | 1.6 |
| Feb. | 28 | 130 | 4.6 | 1.9 | 126 | 4.5 | 1.9 |
| Mar. | 31 | 164 | 5.3 | 2.2 | 135 | 4.4 | 1.8 |

-continued

| | | Guam | | | Hawaii | | |
|---|---|---|---|---|---|---|---|
| Month | Days/ Month | Elec. Prod'n[2] (kWh/Mo) | Elec. Prod'n[2] (kWh/Day) | Water Prod'n[3] (Gal/Day) | Elec. Prod'n[2] (kWh/Mo) | Elec. Prod'n[2] (kWh/Day) | Water Prod'n[3] (Gal/Day) |
| Apr. | 30 | 152 | 5.1 | 2.1 | 128 | 4.3 | 1.8 |
| May | 31 | 145 | 4.7 | 1.9 | 132 | 4.3 | 1.8 |
| Jun. | 30 | 137 | 4.6 | 1.9 | 137 | 4.6 | 1.9 |
| Jul. | 31 | 131 | 4.2 | 1.8 | 132 | 4.3 | 1.8 |
| Aug. | 31 | 128 | 4.1 | 1.7 | 141 | 4.5 | 1.9 |
| Sep. | 30 | 127 | 4.2 | 1.8 | 135 | 4.5 | 1.9 |
| Oct. | 31 | 138 | 4.5 | 1.9 | 125 | 4.0 | 1.7 |
| Nov. | 30 | 128 | 4.3 | 1.8 | 112 | 3.7 | 1.6 |
| Dec. | 31 | 135 | 4.4 | 1.8 | 119 | 3.8 | 1.6 |
| Total Annual | 365 days | 1,657/yr | | | 1,542/yr | | |

Table 2. Electricity generation and water production based on a 1.0 kW photovoltaic system. This system uses (10) 100 Watt modules for a total area of 100 ft2. Site No. 1—Guam: Latitude=13.550 N, Longitude=144.830 W. Site No. 2—Hilo, Hi.: Latitude=19.720 N, Longitude=155.070 W. DOE/NREL PVWATTS computer model (2000) was used to calculate a first approximation of electric energy production; the solar insulation data for the two sites are included in the model's database. Energy cost: 2,400 Watts/Gal for water production (600 Wh/Qt=632 Wh/L). Actual water production will be lower depending on efficiencies of particular systems. Water saturated air is assumed (See Table 1 for effect of undersaturation during chilling).

When these calculations are extrapolated to a larger array, for instance as might be used to cover the roof of buildings, the amount of water that could be produced could be significant. Given a panel array surface of, for instance, 1,000 square feet, or about the size of the roof of a bungalow that would be occupied by a single family, about 40 kVh of electricity can be produced each day in each of the locations represented in Table 2 and in other regions having similar relative humidity and air temperatures. Integrated high quality water and electricity production using the integrated water harvester concept will have the greatest impact where population is widely scattered, and infrastructure for both water and electricity production is poor.

Another preferred embodiment of atmospheric water harvesters is as small, portable, self-powered, stand-alone units. These are for use where relatively small amounts of at least sustenance levels of high quality potable water are required and/or where the time to install water harvester units for water production can be very short, such as immediately following a natural disaster. Emergency supplies of potable water are almost always a priority immediately following typhoon, hurricane, earthquake, some terrorist activities, etc., (i.e., following natural or man-made disasters), where water and electrical systems are rendered unusable, often for substantial periods or time. For instance, typhoons affecting the American island possessions in the Southwest Pacific Ocean in 2002 created immediate need for potable water, which was only met by supplying bottled water by air freight in the near-term. Because bottled water is suitable for only one-time use as drinking water, the water to meet the disaster relief situation has to be flown or shipped in for often considerable periods of time. Waste bottles also create a waste or pollution issue, especially in a fragile environment such as an oceanic island.

Figure 9:
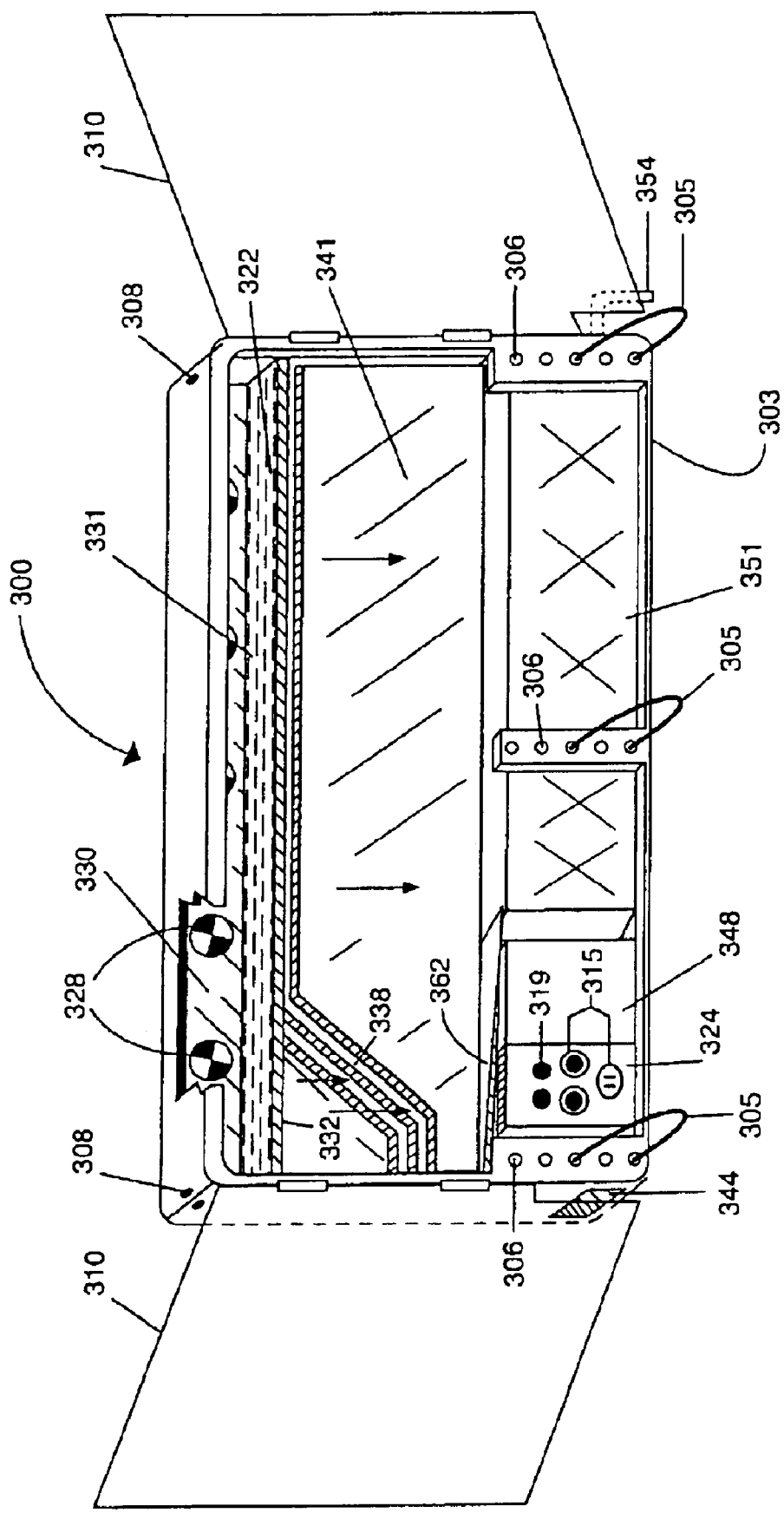
FIG. 9 is a diagrammatic perspective view of a portable water harvester according to the invention.

In emergency situations, the amounts of water used to sustain human life can be much smaller than normal water use. The U.S. Department of Defense, for instance, recommends 1–3 gallons of water per soldier per day, but accepts 1 gal/day per person as a minimum in constrained circumstances. This provides a rough guide to the minimum water production required for atmospheric water harvesters used in a disaster relief situation Portable water harvesters according to the invention are unitary and self-contained apparatus in that they contain the means to produce electrical energy and means to extract water from the air using this energy, They have a maximum of integral controls and are designed to be simply deployed so that they automatically extract atmospheric moisture and produce potable water in an efficient manner. As illustrated in FIG. 9, stand-alone water harvesters 300 consist of a case or housing 303 which, in a preferred embodiment, is molded high impact plastic or other material which has been designed specifically for strength, light weight, and durability and which forms the frame within and upon which all other components of the apparatus and its supports and connections are fixed. The case is special also with respect to its stand-alone nature and the requirements for operating in a variety of conditions. This embodiment is shown with its long axis parallel to the ground, but other embodiments may stand with their long axis vertical. Other embodiments may be more equi-dimensional or proportioned differently where either weather conditions or other physical constraints (such as a maximum size to suit deployment in restricted spaces) may be important.

This portable water harvester is preferably employed in an upright or slightly inclined position, so no provision for collection of rainwater is made. The sole purpose of the apparatus is to produce potable water by extracting atmospheric moisture. The water harvester is meant to be located so that its front (i.e, the side visible in FIG. 9) always faces generally sunward. Consequently, the rear of the apparatus will be shaded to some extent. The water harvester may be moved and tilted during the day in order to allow its front to face the sun more directly. Easily and quickly attachable feet or props to hold the apparatus in an upright or inclined position, e.g., steel wire braces 305 and their receiving holes 306 formed in the case 303, are provided so that setup of the apparatus on even, uneven, or sloping ground is facilitated. Ring eyelets 308 are provided in the upper part of the apparatus to allow lines to be attached to each end or the top of a free-standing water harvester to further secure it in an upright position.

Energy for the operation of the portable water harvester is provided by photovoltaic panels 310 supplied with the water harvester. A primary design aim is that the power required to produce a certain quantity of water (which can be different from place to place or for different electricity requirements) is produced by the apparatus. External power may be used, but it is not required. These photovoltaic panels may be integral with the case 303 and folding and affixed to the front of the water harvester case, e.g., by hinges as shown; flexible panels fixed to the case (not illustrated); or free-standing from the case and connected by wire (not illustrated). Additional photovoltaic panels may be located on the front face of the case, but they are not shown in FIG. 9 since front face access panels by means of which access is gained to the interior of the water harvester are not shown (i.e., as if removed from the water harvester unit) in FIG. 9 for better illustration of internal components. Both integral and free-standing photovoltaic panels may be employed simultaneously. Where photovoltaic panels optimized for use with water harvesters are not integral parts of the structure of the water harvester, they are also supplied along with the water harvester.

Where no provision is made for storage of electricity, or where no other source of electricity is available, electricity generation and water production are carried out only during the day. Where other sources of electricity are available, or where it is desirable to produce additional electricity to be stored rather than to use all of the electricity produced by the supplied photovoltaics for just extraction of water, sockets 315 for power output and power sensors and regulators (not shown) are provided for electrical connection and are located in the electrical and control housing 324 Power input connectors 319 are also provided, e.g., for use where other sources of power are available. Where other sources of power are available, this will allow operation of the apparatus during those times of the diurnal cycle when the relative humidity is high but sufficient sunlight may not be available to provide the required amounts of electrical energy. This housing 324 also contains computer control apparatus that apportions energy from any source and regulates moisture extraction according to predetermined algorithms embedded in a micro-controller. Provision exists for rapid replacement of controller (ROM chips) so that water harvesters can be reprogrammed easily for different areas that have different sunlight and atmospheric conditions.

In one configuration, variable speed fans 328 are provided at the upper rear of the case 303, in a cut-out portion 330, and draw air into the apparatus from the rear, shaded area of the case at a rate determined by the controller. These air intakes may be screened (not shown) to keep out insects and dust. The relative humidity of the cooler air from the shaded side of the apparatus is likely to be higher than warmed air from the front, sunny side of the water harvester. The ideal or operational aim for air flow (i.e., the optimal flow rate) is to only ingest as much air as can be fully chilled over a particular time, so that excess air is not chilled and so that all the air that is passed through the apparatus is chilled only to the extent necessary to produce a desired amount of water. Thus, minimal power is required to maintain the optimal airflow, even where conditions such as air temperature, relative humidity, and available power change, as they naturally do during diurnal cycles.

The air is brought by the fans into the air equilibration chamber 331 in order to allow the air to be spread uniformly along the top, and then through an air diffuser 332, which allows uniform air flow through the separated airways below. The diffuser can be a coarse porous material or a metal or plastic strip which has slits or holes 322 (indicated by dashes in its upper surface on FIG. 9) through which the air can pass. The air (arrows) then passes downward through airways 338 formed between condensation panels 341 (three of which are shown, for illustration), where the air is chilled. Condensation thus forms on the condensation panels 341. (Theoretically, a single panel 341 could be used, with airways formed between the single panel 341 and the walls of the case 303.) The air is then exhausted to the side and front of the case through an exhaust 344 that is smaller than the air intakes, which causes the exhaust speed of the air to be greater than the intake speed of the air so that the exhaust can be deflected away from the rear of the case, where the air intakes are placed.

Alternatively, in another configuration, a fan assembly having one or more fan motors located inside the case near the exhaust port blow air out through the exhaust port, thus causing air to flow into the case through air intakes located at the upper rear portion of the case. This lay-out permits the air intakes to be narrow slits and the air space in the air equilibration chamber above the diffuser to be narrower so that a larger surface area coverage of condenser plate assemblies can be fitted within the case.

In yet another configuration, fans for moving air can be placed at any point, and the air is preferably caused to move upwardly from the lower part of the apparatus through the airways bounded by condensation surfaces. This has the advantage of exposing the most highly saturated air to the lower part of the condensation panels, from where condensed water may collect and flow immeditely into the water collector and minimize its flow down the collector panels. Rapid collection of the condensed water will remove it from the airstream quickly and will preclude minor reabsorbtion of the water by the air where slight temperature and humidity variations may develop in the airways.

Where heat is produced as a byproduct of the refrigeration system, this heat has to be dissipated. Regardless of the locations of the motive electrically driven fans 328 in this preferred mode of operation, chilled air (arrows) that moves through the airways 338 and across the condensation panels 341 is then used to cool the heat exchangers of the electrically driven compressors or other refrigeration apparatus 348 in order to enhance the overall thermodynamics and performance. Because the air that has been chilled and subjected to water condensation will be cooler than the ambient air outside the apparatus, the overall efficiency of the condenser/refrigerator system is enhanced by passing this chilled air over heat exchangers that will more efficiently remove the heat than would be the case if the air were not chilled. Because the condensed water will also be cooled and removed from the water harvester, however, additional cooling air will need to be drawn from outside the apparatus and passed through a small but efficient heat exchanger (not shown, hidden by electrical and control box 324).

Chilled water is produced by condensation on condensation panels 341, which are optimized for light weight, durability, and performance. These are single- or double-sided and are spaced to form airways between the panels that are optimized for a relatively low volume of input air. Water that condenses on the panels 341 flows under the effect of gravity down the condensation surfaces and is collected in an integral water collector 351 in the base of the apparatus. This water collector is a small tank from which water is drained from the apparatus to water storage apparatus outside of the water harvester through a drain 354. The surface of the condensation panels are coated with hydrophobic and hydrophyllic materials that promote condensation (causing water to condense) and to then bead up and flow along the surfaces. A water deflector 362, which is placed over components in the lower part of the apparatus to shelter them from the dripping condensed water, allows water from the overhead condensation panels to flow into the water collector 351.

Portable water harvesters may be specially optimized for disaster relief situations. In this embodiment of the portable water harvester, it is designed to have a long shelf life so that they can be stored for considerable periods of time without significant deterioration prior to rapid deployment. They are sized to meet storage and emergency air transport requirements and are designed and packaged to provide for local deployment under primitive conditions where this may be done by hand over rough ground.

Portable atmospheric water harvesters can also provide substantial water under conditions where the use of the water is periodic. The production of water is semi-continuous, within the diurnal cycle, while use of the water may take place over shorter periods of time. A water harvester that produces water over the period of a week but where the demand for water is possibly for only a few hours of a few days, for instance, will result in quantities of water well above the subsistence level for the periods of time over which the water is required.

The above described embodiments of the invention are illustrative. Other embodiments will occur to those having skill in the art. All such embodiments are deemed to be within the scope of the following claims

I claim:

1. An autonomous apparatus for harvesting atmospheric moisture, said apparatus comprising:
   an energy-gathering member and a first condensation member, said energy-gathering member being spaced from said first condensation member so as to define a first air passageway between said energy-gathering member and said first condensation member through which atmospheric air can flow, said first condensation member having a first condensation surface facing said first air passageway and on which atmospheric moisture is condensed; and
   a cooling system disposed so as to cool said first air passageway and/or said first condensation surface by an amount sufficient to cause moisture within atmospheric air flowing through said first air passageway to condense and collect on said first condensation surface;
   wherein said energy-gathering member gathers energy and provides electrical power to operate said cooling system.

2. The apparatus of claim 1, further comprising frame members which hold said energy-gathering member and said first condensation member in spaced relationship.

3. The apparatus of claim 1, wherein said energy-gathering member comprises photovoltaic cells.

4. The apparatus of claim 1, further comprising a second condensation member spaced from said first condensation member to form a second air passageway, said second condensation member having a second condensation surface facing said second air passageway.

5. The apparatus of claim 4, wherein said cooling system is further disposed so as to cool said second air passageway and/or said second condensation surface by an amount sufficient to cause moisture within atmospheric air flowing through said second air passageway to condense and collect on said second condensation surface.

6. The apparatus of claim 1, wherein said cooling system comprises a conventional gas- or gas/liquid-phase refrigeration system.

7. The apparatus of claim 1, wherein said cooling system comprises cooling coils that are spaced from said first condensation surface and that are disposed within said first air passageway to cool said air passageway.

8. The apparatus of claim 1, wherein said cooling system comprises cooling channels that are embedded within said first condensation member and that cool said first condensation surface from within said first condensation member.

9. The apparatus of claim 1, wherein said first condensation surface comprises hydrophilic material.

10. The apparatus of claim 1, wherein said first condensation surface has dendritic channels formed therein to facilitate the flow of condensed and coalesced water along said first condensation member.

11. The apparatus of claim 10, wherein said dendritic channels are lined with hydrophobic material to facilitate the flow of water along said dendritic channels.

12. The apparatus of claim 1, wherein said cooling system comprises solid state heat pumps consisting of thermoelectric cooling devices.

13. The apparatus of claim 1, wherein said cooling system comprises a thermoacoustic heat pump and micro-channel refrigerant channels.

14. The apparatus of claim 1, wherein said cooling system comprises magnetocaloric chillers and heat exchangers.

15. The apparatus of claim 1, further comprising an energy storage device which stores electrical energy provided by said energy-gathering member that is in excess of the amount of electrical power required to operate said cooling system.

16. The apparatus of claim 15, wherein said energy storage device is a rechargeable battery or fuel cell.

17. The apparatus of claim 15, wherein said energy storage device is a capacitor.

18. The apparatus of claim 1, wherein said apparatus is configured to be disposed in a tilted orientation and said first condensation member has a water catchment member at a lower end thereof to catch condensed and coalesced water running down along said first condensation surface.

19. The apparatus of claim 18, wherein said energy-gathering member has a rain catchment member at a lower end thereof to catch rain falling onto and running down along an upper surface of said energy-gathering member.

20. The apparatus of claim 1, further comprising an air thruster arranged to propel air through said first air passageway.

21. An atmospheric moisture-harvesting array, said array comprising:
   a plurality of interconnected atmospheric moisture-harvesting apparatuses, each of said atmospheric moisture-harvesting apparatuses comprising
   an energy-gathering member and a condensation member, said energy-gathering member being spaced from said condensation member so as to define an air passageway between said energy-gathering member and said condensation member through which atmospheric air can flow, said condensation member having a condensation surface facing said air passageway and on which atmospheric moisture is condensed; and
   a cooling system disposed so as to cool said air passageway and/or said first condensation surface by an amount sufficient to cause moisture within atmospheric air flowing through said air passageway to condense and collect on said condensation surface;
   said energy-gathering member gathering energy and providing electrical power to operate said cooling system.

22. The array of claim 21, further comprising a common or centralized refrigeration system which supplies refrigerant to the cooling system of each moisture-harvesting apparatus in said array.

23. The array of claim 21, further comprising a common or centralized electrical system, the energy-gathering member of each moisture-harvesting apparatus in said array providing electrical energy to said common or centralized electrical system.

24. The array of claim 21, wherein said moisture-harvesting apparatuses are disposed on a roof of a building.

25. The array of claim 21, wherein said moisture-harvesting apparatuses form a roof of a building.

26. A method of providing water, said method comprising:
passing moisture-laden atmospheric air through an air passageway and over a condensation surface of a condensation member, said air passageway being formed between said condensation member and an energy-gathering member and said air passageway and/or said condensation surface being chilled by means of a cooling system, whereby moisture in said atmospheric air is caused to condense and gather on said condensation surface; and
collecting said condensed and gathered water;
wherein said cooling system is powered by means of electricity produced by said energy-gathering member.

27. The method of claim 26, further comprising collecting rainwater which falls on said energy-gathering member.

28. The method of claim 26, wherein more energy is produced by said energy-gathering member than is needed to power said cooling system, said method further comprising storing excess energy in an energy storage means.

29. The method of claim 28, further comprising powering said cooling system using energy stored in said energy storage means during periods in which said energy-gathering member does not produce energy.

30. The method of claim 26, wherein said moisture-laden atmospheric air flows naturally through said air passageway due to density differences between cooled air within said air passageway and ambient moisture-laden air.

31. The method of claim 26, further comprising actively conducting said moisture-laden air through said air passageway using an air thruster or blower assembly.

32. An autonomous apparatus for harvesting atmospheric moisture, said apparatus comprising:
a case with one or more chillable condensation panels disposed therein, said one or more condensation panels forming one or more air passageways therebetween and/or between one of said one or more condensation panels and a wall of said case;
refrigeration apparatus which operates to chill said one or more condensation panels;
an opening formed in said case through which air can flow into said case;
an exhaust port through which air that has flowed into said case can exit said case after having passed through said one or more air passageways;
a water collector configured and disposed so as to collect water that has condensed on and flowed down along said one or more condensation panels; and
an energy-gathering member which gathers and provides energy to power said refrigeration apparatus.

33. The apparatus of claim 32, wherein said energy-gathering member comprises one or more photovoltaic panels.

34. The apparatus of claim 33, wherein said one or more photovoltaic panels is or are attached to said case.

35. The apparatus of claim 34, wherein said one or more photovoltaic panels is or are attached to said case by hinge members, thus allowing said one or more photovoltaic panels to be opened from a storage position to an open, operational position.

36. The apparatus of claim 33, wherein said one or more photovoltaic panels is or are separate from said case but is or are operatively connected to said refrigeration apparatus to provide power thereto.

37. The apparatus of claim 32, further comprising one or more fans that are located and positioned to cause air to flow into said case through said opening, through said one or more air passageways, and out of said case via said exhaust port.

38. The apparatus of claim 32, further comprising an air diffuser which is positioned to distribute air flowing into said case via said opening among said one or more air passageways.

39. The apparatus of claim 32, further comprising electrical and control systems.

40. The apparatus of claim 39, wherein said electrical and control systems comprise power outlet sockets by means of which excess power produced by said energy-gathering member can be transferred to excess-energy storage means.

41. The apparatus of claim 39, wherein said electrical and control systems comprise power inlet sockets by means of which supplemental power can be provided to power said refrigeration apparatus.

42. The apparatus of claim 32, further comprising adjustable leg members to permit deployment of said apparatus in a variety of locations and under a variety of topographical conditions.

43. The apparatus of claim 1, further comprising insulation disposed on a surface of said energy-gathering member which faces said first condensation member.

44. The apparatus of claim 1, further comprising screens at ends of said first air passageway.

45. The apparatus of claim 1, wherein said first condensation surface is corrugated or has fins, whereby the surface area or heat transfer area of said first condensation surface is increased to increase the rate of condensation and accumulation of water.

46. The array of claim 21, wherein said atmospheric moisture-harvesting apparatuses are interconnected at an angle with respect to each other and form an apex.

47. The array of claim 21, wherein said atmospheric moisture-harvesting apparatus are open at said apex.

48. The array of claim 47, further comprising a shroud which covers said apex.

49. The array of claim 48, further comprising a fan or thruster assembly supported by said shroud.

* * * * *